United States Patent
Hassmann et al.

[11] Patent Number: 5,126,003
[45] Date of Patent: Jun. 30, 1992

[54] APPARATUS FOR WELDING MULTIPLY WEBS OF SYNTHETIC THERMOPLASTIC MATERIAL

[75] Inventors: Werner Hassmann, Lengerich; Hans-Ludwig Voss, Tecklenburg, both of Fed. Rep. of Germany

[73] Assignee: Windmoller & Holscher, Lengerich, Fed. Rep. of Germany

[21] Appl. No.: 397,786

[22] Filed: Aug. 23, 1989

[30] Foreign Application Priority Data

Aug. 24, 1988 [DE] Fed. Rep. of Germany ....... 3828728

[51] Int. Cl.⁵ ...................... B29C 65/10; B29C 67/74
[52] U.S. Cl. .................................. 156/497; 156/515
[58] Field of Search ............... 156/82, 251, 497, 499, 156/515; 493/192

[56] References Cited

U.S. PATENT DOCUMENTS

| | | | |
|---|---|---|---|
| 2,372,737 | 4/1945 | Phillips | 156/497 |
| 3,239,402 | 3/1966 | Ecklund et al. | 156/497 |
| 3,402,089 | 9/1968 | Seaman | 156/497 |
| 3,488,244 | 1/1970 | Lepisto | 156/499 |
| 3,694,289 | 9/1972 | Piazze | 156/380 |
| 3,720,565 | 3/1973 | Cavanna | 156/497 |
| 4,308,087 | 12/1981 | Johnson | 156/497 |
| 4,318,768 | 3/1882 | Johnson | 156/494 |
| 4,450,038 | 5/1984 | Ishii et al. | 156/497 |
| 4,881,931 | 11/1989 | Buchman | 493/192 |
| 4,929,299 | 5/1990 | Romagnoli | 156/497 |
| 4,976,811 | 12/1990 | Siebert | 156/82 |

FOREIGN PATENT DOCUMENTS 3807793 9/1988 Fed. Rep. of Germany .
0530803 10/1976 U.S.S.R. ............... 156/497

*Primary Examiner*—Michael W. Ball
*Assistant Examiner*—Steven D. Maki
*Attorney, Agent, or Firm*—Fleit, Jacobson, Cohn, Price, Holman & Stern

[57] ABSTRACT

An apparatus for welding webs of synthetic thermoplastic material as they move around a deflecting roller comprises an elongate housing, which is movable toward the deflecting roller to assume a position in which said housing is approximately concentric to said roller and closely surrounds said roller around a part of its periphery, and said housing is provided with at least one longitudinally extending hot-air duct, which is curved in the same sense as the housing and is provided with an inlet for receiving flowing hot air and is formed with a plurality of outlet bores or gaps in that wall of the housing which faces the deflecting roller. In order to minimize heat losses, the housing contains a second passage, which approximately concentrically surrounds the hot-air passage and contains an elongate heating element, and the second passage adjacent to one end thereof is provided with an inlet opening for receiving flowing air and adjacent to its opposite end is provided with an opening or line through which the second passage communicates with the hot-air passage.

4 Claims, 2 Drawing Sheets

APPARATUS FOR WELDING MULTIPLY WEBS OF SYNTHETIC THERMOPLASTIC MATERIAL

BACKGROUND OF THE INVENTION

1. Field of the Invention

This invention relates to an apparatus for welding multiple webs of synthetic thermoplastic material as they move around a deflecting roller, which apparatus comprises an elongate housing, which is movable toward the deflecting roller to assume a position in which said housing is approximately concentric to said roller and closely surrounds said roller around a part of its periphery, and said housing is provided with at least one longitudinally extending hot-air duct, which is curved in the same sense as the housing and is provided with an inlet for receiving flowing hot air and is formed with a plurality of outlet bores or gaps in that wall of the housing which faces the deflecting roller.

2. Description of the Prior Art

A known apparatus of that kind is shown in FIG. 1 of the drawing and comprises an approximately semicircular housing 3, which embraces a deflecting or reversing roller 1 on approximately one-half of its periphery. A multiple film seb or a continuous tubular film 2 of synthetic thermoplastic material is trained around said roller. The housing has milled openings, which constitute hot-air passages 4 and 5 and are separated by a wall at their inner ends, where they are provided with radial tubular ports 6. The tubular ports 6 are connected to the housing 3 by retaining elements 7. The tubular ports 6 constitute parts of a heater 8, which serves to heat air that has been blown into the heater through a tubular port 9. The heated air is forced into the passages 4 and 5 through the tubular ports 6. The heated air exits from the housing 3 through a multiplicity of small bores 10 and causes the two plies of the tubular film 2 to be welded to each other in the area with which the tubular film moves over the row of bores 10. A plurality of welding apparatuses constituted by respective housings 3 may be arranged one beside the other. A disadvantage of the known apparatus described with reference to FIG. 1 resides in that the heater 8 must have a high power to ensure that the air exiting from the bores 10 will be at a sufficiently high temperature for a satisfactory welding of the two film plies to each other. The fact that a high power is required for the heater 8 is due not only to the loss of radiant heat but also to the design of the heater. The latter consists of a solid block of iron, which is heated by a heating cartridges, which have been inserted into bores. Cold air from the tubular port 9 is blown through additional bores, which are provided in the iron block. That air is heated in said block and through the tubular ports 6 enters the housing 3 of the welding apparatus.

SUMMARY OF THE INVENTION

It is an object of the invention so to improve an apparatus which is of the kind described first hereinbefore that the heat losses will be minimized.

In an apparatus which is of the kind described first hereinbefore that object is accomplished in accordance with the invention in that the housing contains a second passage, which approximately concentrically surrounds the hot-air passage and contains an elongate heating element, and the second passage adjacent to one end thereof is provided with an inlet opening for receiving flowing air and adjacent to its opposite end is provided with an opening or line through which the second passage communicates with the hot-air passage. In the apparatus in accordance with the invention the air by which the welding is effected is heated directly in the housing of the welding apparatus so that losses of radiant heat will be minimized. The apparatus in accordance with the invention will ensure that the heating power which is supplied is highly predominantly used to heat the air and that heat losses will be minimized.

The heating element suitably comprises a heating coil.

The second passage, which contains the heating element, may communicate with the hot-air passage through a line which opens into the hot-air passage approximately at the center of its length.

It is desirable to provide a pair of hot-air passages and a pair of second passages, which contain respective heating elements, and the passages of each of said pairs may be separated by partitions of the housing at their inner ends. The second passages, which contain respective heating elements, are desirably provided at their outer ends with tubular parts or with openings for blowing air into the second passages.

DETAILED DESCRIPTION OF THE PREFERRED EMBODIMENT

Figure 1:
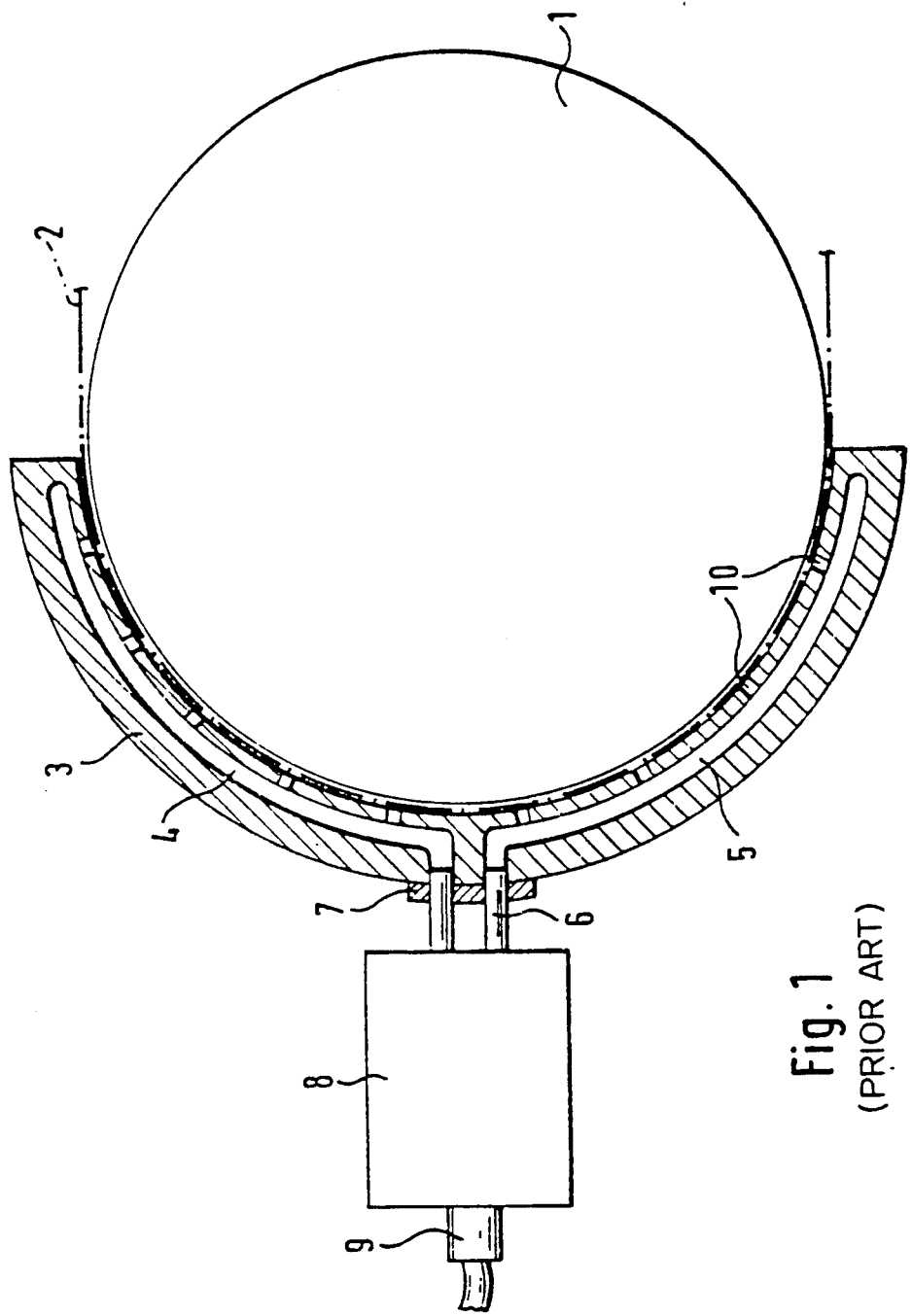
FIG. 1 is a longitudinal sectional view showing a welding apparatus of the prior art.
Figure 2:
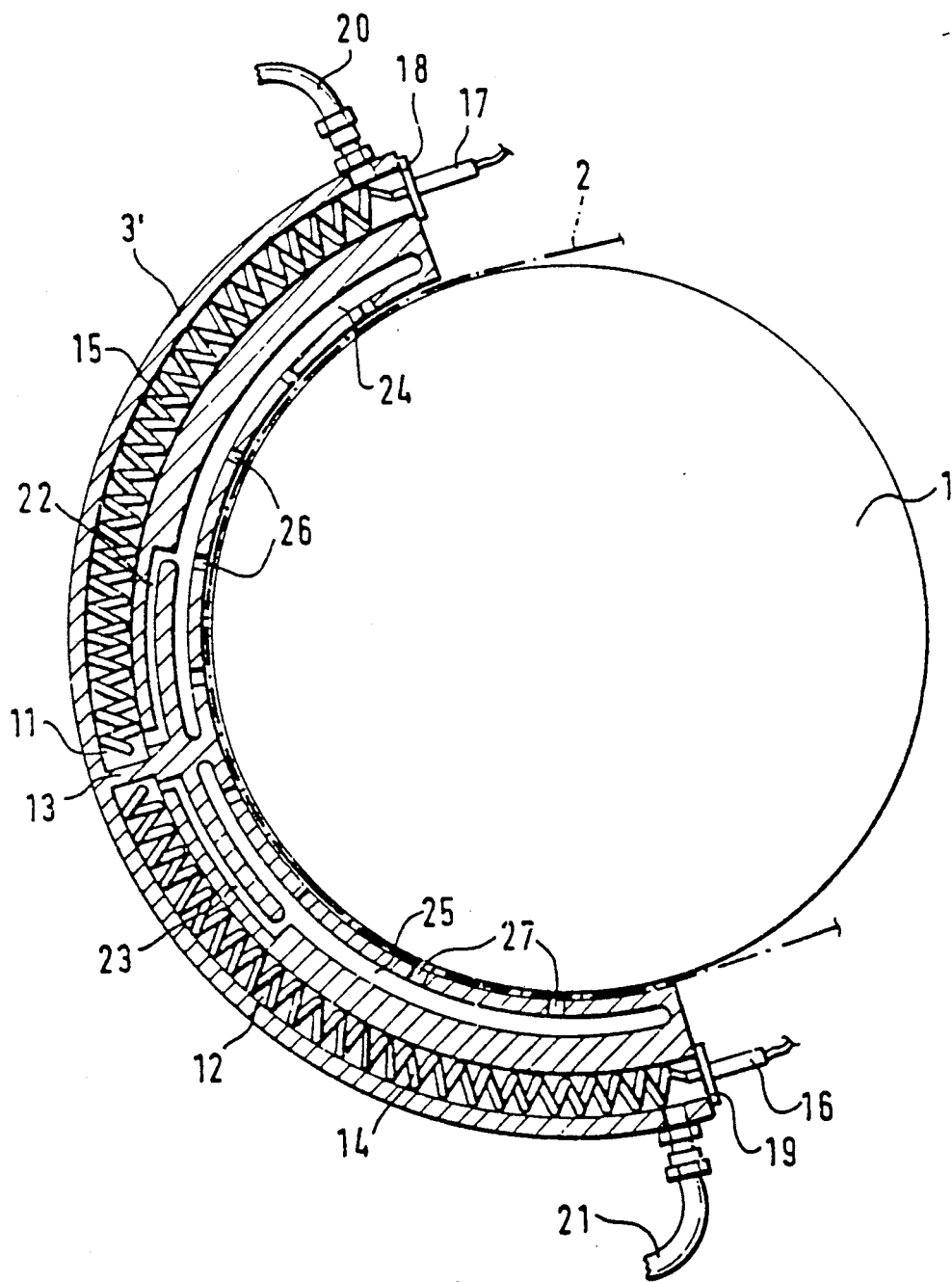
FIG. 2 is a longitudinal sectional view showing a welding apparatus which embodies the invention.

An illustrative embodiment of the invention will now be described more in detail with reference to FIG. 2 of the drawing.

A tubular film 2 is to be divided into two parts by a longitudinal seam weld and as illustrated is caused to move around a deflecting or reversing roller 1. The semicircular housing 3' of the welding approximately one-half of its periphery. The tubular film moves through the arcuate gap which is defined between the housing 3' and the reversing roller 1. The housing 3' is formed with two passages 11, 12, which extend from respective ends of the housing 3' and are separated at their inner ends by a web 13. The two passages 11 and 12 are concentric to two hot-air passages 24 and 25, which are also formed in the housing 3' and at their inner ends are also separated by a web. Two heating coils 14 and 15, respectively, extend in the passages 11, 12 and are provided with terminals 16, 17, which extend outwardly through the covers 18 and 19 by which the passages 11,12 are closed from the atmosphere. The passages 11,12, which contain respective heating coils, are provided at their outer ends with radial tubular ports, which are connected to air supply lines 20 and 21. Cold air is blown through said air supply lines 20 and 21 into the passages 11 and 12, in which the air is heated as it flows in contact with the heating coils 14 and 15. At the inner end of each passage 11 or 12 the hot air is conducted through manifold passages 22 and 23 into the hot-air passages 24 and 25 and from the latter flows through the rows of bores 26 and 27 to contact the tubular film 2.

The housing 3' of the welding apparatus is closed by a cover, not shown, on that side which faces the viewer. The housing 3' is movably mounted on a holder and can be moved relative to said holder away from and toward the reversing roller 1.

We claim:

1. An apparatus for welding webs of synthetic thermoplastic material as they move around a deflecting roller, which apparatus comprises an elongate curved housing, which is movable toward the deflecting roller to assume a position in which said housing is approximately concentric to said roller and closely surrounds said roller around a part of its periphery, and said housing is provided with at least one longitudinally extending hot-air passage, which is curved in the same direction as the housing and is provided with an inlet opening approximately at the center of its length for receiving flowing hot air and is formed with a plurality of outlet bores or gaps in that wall of the housing which faces the deflecting roller, and the housing contains a second curved passage, which approximately concentrically surrounds the hot-air passage and contains an elongate heating element, the second passage adjacent to one end thereof is provided with an inlet port for receiving flowing air and adjacent to its opposite end is provided with an outlet opening through which the second passage communicates with the hot-air passage, and the second passage which contains the heating element, communicates with the hot-air passage through a line connected to said outlet opening and which opens into the hot-air passage through said inlet opening.

2. An apparatus according to claim 1, characterized in that the heating element comprises a heating coil.

3. An apparatus according to claim 1, characterized in that a pair of hot-air passages and a pair of second passages, which contain respective heating elements, are provided in the housing, and the passages of each of said pairs are separated at inner ends thereof by partitions of the housing.

4. An apparatus according to claim 3, characterized in that the respective inlet ports of the seond passages are provided at outer ends of the second passages.

* * * * *